United States Patent
Ingle et al.

(10) Patent No.: US 8,812,516 B2
(45) Date of Patent: Aug. 19, 2014

(54) DETERMINING TOP N OR BOTTOM N DATA VALUES AND POSITIONS

(75) Inventors: Ajay Anant Ingle, Austin, TX (US); Mao Zeng, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 13/275,351

(22) Filed: Oct. 18, 2011

(65) Prior Publication Data
US 2013/0097187 A1  Apr. 18, 2013

(51) Int. Cl.
*G06F 7/14* (2006.01)
*G06F 17/30* (2006.01)
*G06F 9/30* (2006.01)
*G06F 7/36* (2006.01)

(52) U.S. Cl.
CPC ...... *G06F 7/249* (2013.01); *G06F 9/30* (2013.01); *G06F 7/36* (2013.01)
USPC .......................... 707/748; 707/752; 707/758

(58) Field of Classification Search
CPC .............. G06F 7/24; G06F 9/30; G06F 7/36
See application file for complete search history.

(56) References Cited

U.S. PATENT DOCUMENTS

| | | | |
|---|---|---|---|
| 4,197,580 A | 4/1980 | Chang et al. | |
| 4,422,158 A * | 12/1983 | Galie | 1/1 |
| 4,991,134 A | 2/1991 | Ivsin | |
| 5,386,578 A | 1/1995 | Lin | |
| 5,619,713 A * | 4/1997 | Baum et al. | 1/1 |
| 5,870,584 A | 2/1999 | Bennett | |
| 5,907,842 A | 5/1999 | Mennemeier et al. | |
| 6,546,382 B1 | 4/2003 | Amor et al. | |
| 7,403,944 B2 | 7/2008 | Budd et al. | |
| 7,680,791 B2 | 3/2010 | Callaghan et al. | |
| 2003/0123418 A1 | 7/2003 | Buchert et al. | |
| 2005/0144168 A1 | 6/2005 | Kurokawa et al. | |
| 2007/0088699 A1 | 4/2007 | Edmondson | |
| 2010/0031008 A1 | 2/2010 | Edahiro et al. | |

OTHER PUBLICATIONS

International Search Report and Written Opinion—PCT/US2012/060897—ISA/EPO—Jun. 13, 2013.

* cited by examiner

*Primary Examiner* — Bruce Moser
(74) *Attorney, Agent, or Firm* — Nicholas J. Pauley; Peter Michael Kamarchik; Joseph Agusta (57) ABSTRACT

A method includes executing an instruction at a processor, where executing the instruction includes comparing a data value of a plurality of data values to a first element stored at a first location of a storage device. When the data value satisfies a condition with respect to the first element, the method includes moving the first element to a second location of the storage device and inserting the data value into the first location of the storage device.

22 Claims, 7 Drawing Sheets

DETERMINING TOP N OR BOTTOM N DATA VALUES AND POSITIONS

I. FIELD

The present disclosure is generally related to determining top N or bottom N data values and positions from a plurality of data values.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

One example of a computing operation is the ability to sort a plurality of values in a desired order. Several sort algorithms exist for sorting a plurality of values in ascending or descending order. Sort algorithms may be comparison-based or radix-based. Some examples of comparison-based algorithms include quicksort, mergesort, and heapsort. Some examples of radix-based sort algorithms include radix sort and bucket sort. Performance (or efficiency) of comparison-based sort algorithms may be expressed in "Big O" notation as a function of the comparisons on the number of items 'n' being sorted. For example, a comparison-based sort algorithm may require $O(n*\log n)$ comparisons on average and $O(n^2)$ comparisons in the worst case. The performance of radix-based sort algorithms may be described by the number of times that each item n must be examined. Radix-based sort algorithms may thus require n*key_size comparisons to sort n items, where "key_size" is the size of the sort key. Generally, when key_size is small, radix-based sort algorithms may be faster than comparison-based sort algorithms and when key_size is large, comparison-based sort algorithms may be faster and more efficient than radix-based sort algorithms. Thus, the number of execution cycles required to sort n values increases as the value of n increases resulting in an increased number of processor cycles due to the computation intensive nature of the sort algorithm. Since portable devices may have limited processing resources and limited battery life, sorting all n values may cause a strain on the limited processing resources and on the battery life of such portable devices.

III. SUMMARY

In some cases, it may be desired to sort only a subset of a plurality of data values to obtain a first N maximum data values or a first N minimum data values from the subset of data values, where N is an integer greater than 1. In addition, it may be desired to obtain position information of the N maximum or N minimum data values or any other attributes associated with the data values. For example, it may be desirable to obtain the top N signals (e.g., the top N signals with greatest signal strengths) from a set of signals arriving at different times and from multiple directions (e.g., due to multipath fading causing time lags) at a receiver (e.g., a rake receiver). Signal strengths (e.g., signal energy) may be computed for each of the signals and the top N signals may be determined, where N is a subset of the plurality of received signals. A position indicator (e.g., time of arrival) or any other attribute of each signal may also be included in the top N signals (or bottom N signals). In such a situation, it may not be efficient to perform a sort of the entire set of received signals by using the conventional radix-based or comparison-based sort algorithms and then choosing the N subset of interest.

A method of finding the top N or bottom N data values from a plurality of data values, including position information associated with the N data values, is disclosed. The method uses fewer execution cycles than a complete sort of all of the data values.

If a plurality of data samples includes 'n' data values, a single instruction may be executable by a processor (such as a processor in a mobile phone) to identify the top N or the bottom N data values from the plurality of data values, where N is an integer greater than 0 and where N is less than n. Further, a position indicator (e.g., an index) corresponding to each of the N data values may be determined. The data values may be stored at a memory and certain data values may be selectively loaded into a storage device (e.g., a memory, a register, etc). The storage device may include N storage locations corresponding to the desired top N or bottom N values of interest. Because the single instruction determines top N or bottom N data values and corresponding position indicators, without performing a sort of each of the plurality of data values, fewer execution cycles of the processor can be utilized, leading to an increase in the efficiency of the processor.

In a particular embodiment, a method includes executing an instruction at a processor, where executing the instruction includes comparing a data value of a plurality of data values to a first element stored at a first location of a storage device (the storage device having N entries). When the data value satisfies a condition with respect to the first element, the method includes moving the first element to a second location of the storage device and inserting the data value into the first location of the storage device. The instruction may be executed for each of the data values, and the resulting data stored in the storage device is the top N values, or the bottom N values, and corresponding position information for each of the N values.

In another particular embodiment, an apparatus includes a memory storing an instruction that identifies a plurality of data values. The apparatus also includes a comparator to compare a data value of the plurality of data values to a first element stored at a first location of a first storage device. The apparatus further includes a logic unit to move the first element to a second location of the first storage device and to insert the data value into the first location of the first storage device when the data value satisfies a condition with respect to the first element.

In another particular embodiment, an apparatus includes a memory storing an instruction that identifies a plurality of data values and a processor to execute the instruction. The processor includes a first comparator to compare a first data value of a first set of data values of the plurality of data values to a first element stored at a first location of a first storage device. The processor includes a first logic unit to move the first element to a second location of the first storage device and to insert the first data value into the first location of the first storage device when the first data value satisfies a condition with respect to the first element. The processor also includes a second comparator to compare a second data value of a second set of data values of the plurality of data values to an element stored at a location of a second storage device. The processor further includes a second logic unit to move the element to a second location of the second storage device and to insert the second data value into the location of the second storage device when the second data value satisfies the condition with respect to the element. An output of the second storage device is coupled to an input of the first storage device.

In another particular embodiment, an apparatus includes a memory storing an instruction that identifies a plurality of data values and means for processing the instruction. The means for processing includes means for comparing a data value of the plurality of data values to a first element stored at a first location of a first storage means. The means for processing also includes means for moving the first element to a second location of the first storage means and means for inserting the data value into the first location of the first storage means when the data value satisfies a condition with respect to the first element.

In another particular embodiment, a non-transitory computer-readable medium includes program code that, when executed by a processor, causes the processor to execute an instruction that identifies a plurality of data values. Executing the instruction includes comparing a data value of the plurality of data values to a first element stored at a first location of a first storage device. Executing the instruction also includes moving the first element to a second location of the first storage device and inserting the data value into the first location of the first storage device when the data value satisfies a condition with respect to the first element.

One particular advantage provided by at least one of the disclosed embodiments is an increase in the efficiency of the processor and a reduction in power consumption of the processor that executes a top N or a bottom N instruction as compared to performing a full sort on n values, where n is greater than N.

Other aspects, advantages, and features of the present disclosure will become apparent after review of the entire application, including the following sections: Brief Description of the Drawings, Detailed Description, and the Claims.

V. DETAILED DESCRIPTION

Figure 1:
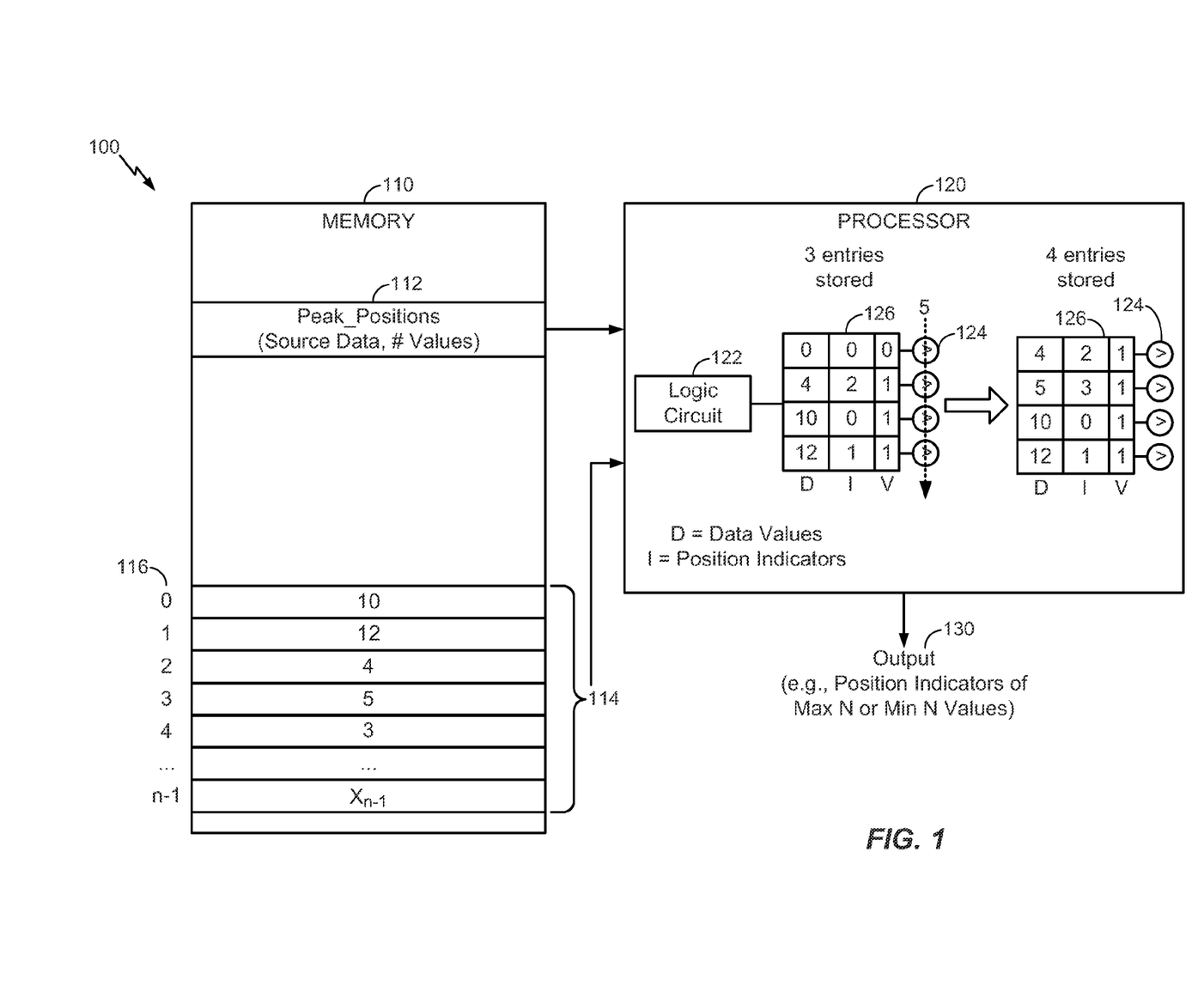
FIG. 1 is a particular illustrative embodiment of a system that executes an instruction to determine top N or bottom N data values and positions from a plurality of data values.

Referring to FIG. 1, a particular illustrative embodiment of a system that executes an instruction to determine top N or bottom N data values and positions from a plurality of data values is disclosed and generally designated 100.

The system 100 includes a memory 110 coupled to a processor 120. The memory 110 may store a plurality of instructions including an instruction 112 that identifies a plurality of data values 114. For example, the memory 110 may store the instruction 112, a Peak_Positions instruction that identifies source data and a number of data values (i.e., Peak_Positions (Source Data, #Values)). The operands "Source Data" and "#Values" of the Peak_Positions instruction 112 may identify a plurality of data values, such as the data values 114 (i.e., 10, 12, 4, 5, 3 ... $X_{n-1}$) in the memory 110. The plurality of data values 114 may have corresponding position index values 116 (i.e., 0, 1, 2, 3, 4 ... n−1). As illustrated, a first data value '10' may be stored at data location '0' (position index value of '0') and a second data value '12' may be stored at data location '1' (position index value of '1') of the memory 110. Similarly, third, fourth, fifth, and $n^{th}$ data values '4,' '5,' '3,' and '$X_{n-1}$' respectively, may be stored at data locations '2,' '3,' '4,' and 'n−1,' respectively, of the memory 110. Thus, each of the plurality of data values 114 has a corresponding position index value 116. For example, position index values 0 to n−1 correspond to the plurality of data values 10 to $X_{n-1}$. In a particular embodiment, the position index values 116 may be generated on the fly as the data values 114 are read from the memory 110.

The processor 120 may include a logic circuit 122, a storage device 126, and a plurality of comparators 124. The logic circuit 122 may be operable to move a first element in a first location of the storage device 126 to a second location of the storage device 126. In addition, the logic circuit 122 may be operable to insert data into a location within the storage device 126. The number of the plurality of data values 114 is designated by 'n' and may be identified by the operand "#Values" of the Peak_Positions instruction 112. The data values of the plurality of data values 114 is designated by 'D' and the position indicators 116 corresponding to the plurality of data values 114 is designated 'I,' as illustrated in FIG. 1.

During operation, the processor 120 may receive the Peak_Positions instruction 112 and the plurality of data values 114. The logic circuit 122 within the processor 120 may process the Peak_Positions instruction 112 with respect to the plurality of data values 114. For example, the logic circuit 122 may receive and evaluate each data value of the plurality of data values 114. At an initial state, each location (e.g., 4 locations) of the storage device 126 may be empty or contain '0' values in the data portions (i.e., D portion) and in the position indicator portions (i.e., I portion) of the storage device 126. In addition, the validity bits for each location of the storage device may be set as invalid (i.e., '0'). Hence, all initial entries in the storage device 126 may be zeros. In addition, if validity bits are not available to initialize the storage locations, the entries in the storage locations may be set to a minimum value when performing a top N determination. Likewise, the entries in the storage locations may be set to a maximum value when performing a bottom N determination. For example, if the range of data values to be processed is 10 to 30, the storage locations may be set to 9 when performing a top N determination and set to 31 when performing a bottom N determination. It should be noted that for signed and unsigned numbers, the minimum and maximum values may be different values.

The storage device 126 is shown in FIG. 1 to transition from including three of the plurality of data values 114 to including 4 of the plurality of data values 114. For example, after initialization of the storage locations of the storage device 126 (e.g., setting all entries in the storage device 126 to zero and/or clearing all validity bits in the storage device 126), the data values '10,' '12,' and '4' and corresponding position indicators '1,' '0,' and '2' may be loaded into the storage device 126, as further described with reference to steps A-D of FIG. 2. In particular, the storage device 126 shows the first data value '10' having a position index '0,' the second data value '12' having a position index '1,' and the third data value '4' having a position index '2.' It should be noted that the data values are organized in the storage device 126 from the highest data value to the lowest data value. For example, the first element of the storage device 126 (i.e., the first storage location of the storage device 126) includes data value '12' with a position index '1,' the second element includes data value '10' with a position index '0,' and the third element includes data value '4' with a position index '2.'

The logic circuit 122 may then receive and process the fourth data value of the plurality of data values 114. For example, the logic circuit 122 may receive the data value '5' with a position index '3.' In this case, the logic circuit 122 compares the data value '5' to the data values in each of the plurality of storage locations (i.e., each element) of the storage device 126 by use of the comparators 124. For example, the data value '5' may be compared to the first data value '12, the second data value '10,' and the third data value '4' stored in the storage locations of the storage device 126. Since the data value '5' is not greater than the data values '12' or '10, the data value '5' does not replace the data value '12' in the first storage location or the data value '10' in the second storage location.

However, since the data value '5' is greater than the data value '4,' (e.g., as determined by the comparator 124 coupled to the third storage location of the storage device 126) the logic circuit 122 may move the data value '4' (i.e., the third data value) from the third storage location of the storage device 126 to the fourth storage location (which includes a zero validity bit since V=0, indicating an invalid state) and insert the data value '5' into the third storage location of the storage device 126. In addition, the position index value '3' that corresponds to the position indicator of the data value '5' is also inserted into the third storage location of the storage device 126. In a particular embodiment, the move and insert operations may be performed in the same execution cycle of the processor 120. The result of performing the move and insert operation with respect to the fourth data element after processing described above is shown in FIG. 1 where 4 entries are stored within the storage device 126. Operation of the logic circuit 122, the comparators 124, and the storage device 126 is further described with reference to FIGS. 2-3.

It should be noted that one or more elements of the storage device 126 may be moved to one or more storage locations of the storage device 126 when a particular data value received at the storage device satisfies the condition with respect to the one or more elements. For example, if the storage device 126 of FIG. 1 includes the data values '10,' '5,' and '4' in the first, second, and third storage locations, respectively, and the data value '12' is received for processing, because the data value '12' satisfies the condition with respect to the data values '10,' '5,' and '4' (i.e., greater than each of data values '10,' '5,' and '4'), multiple data values may be moved for the data value '12' to be inserted (i.e., data value '10' is moved from the first storage location to the second storage location, data value '5' is moved from the second storage location to the third storage location, data value '4' is moved from the third storage location to the fourth storage location, and then data value '12' is inserted into the first storage location). It should also be noted that if a data value received for processing is equal to one or more of the data values stored in one or more of the storage locations of the storage device, the data value is treated as not greater than the one or more data values (i.e., the greater than condition is not satisfied) for a top N process. Conversely, if a data value received for processing is equal to one or more of the data values stored in one or more storage locations of the storage device, the data value is treated as not less than the one or more data values (i.e., the less than condition is not satisfied) for a bottom N process. Thus, a data value having the same value as a stored data value does not replace the stored data value.

While the logic circuit 122 has been illustrated with respect to operating on the third and fourth elements of the storage device 126, it should be understood that the logic circuit 122 may operate on each of the elements of the storage device 126, including the first, second, third, and fourth elements in the storage device 126. In this manner, the logic circuit 122 may process each of the data values from the plurality of data values 114 in order to determine a top N set of the plurality of data values 114. To determine a bottom N set of data values, the comparators 124 may be inverted (e.g., "less than" comparators instead of "greater than" comparators). Although the examples illustrate "greater than" and "less than" comparators, it should be noted that logic may be implemented in addition to or instead of the "greater than" or "less than" comparators. For example, other criteria may be implemented in logic based on various properties of the plurality of data values. To illustrate, logic may be implemented to determine even numbered data values, odd numbered data values, every third data value that is received by a particular antenna, positive data values, negative data values, or any combination of criteria. Further, the processor 120 and the logic circuit 122 therein may process each of the plurality of data values 114 in order to execute the Peak_Positions instruction 112 of the memory 110. The final result of performing each of the processing steps to execute the instruction 112 is produced at an output 130. The output 130 may include position indicators and the corresponding data values of the top N or bottom N values of the plurality of data values 114. For example, if the plurality of data values 114 includes sixteen values (i.e., n=16), the top four or the bottom four of the sixteen values (i.e., N=4) may be produced by the output 130. In addition, the position indicators of each of the top N or the bottom N data values may also be provided at the output 130. Thus, the logic circuit 122 of the processor 120 may be configured to output a plurality of position indicators where each position indicator of the plurality of position indicators is associated with a corresponding data value of the plurality of data values 114. In a particular example, a particular subset of the position indicators 116 that are associated with a corresponding subset of the data values 114 and that satisfy a top N or a bottom N criterion are output at the output 130 of the processor 120 in response to execution of the Peak_Positions instruction 112 as described. Because the Peak_Positions instructions 112 does not perform a full sort on each of the entire plurality of data values 114 to obtain top N or bottom N data values including corresponding position indicators, an increase in the efficiency of a processor and a reduction in power consumption of the processor may be achieved.

Figure 2:
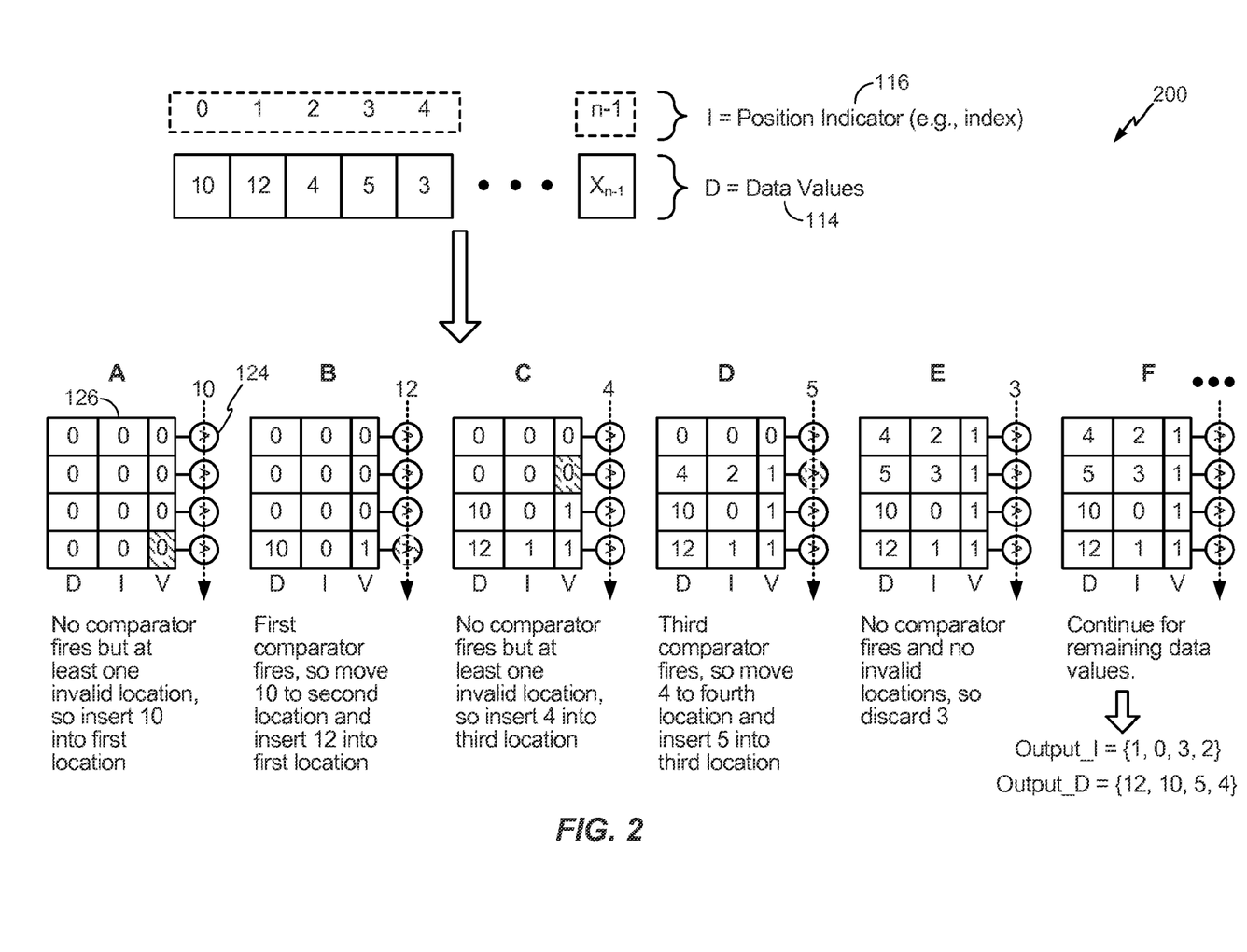
FIG. 2 is diagram that illustrates execution of an instruction to determine top N or bottom N data values and positions from a plurality of data values.

Referring to FIG. 2, a particular illustrative embodiment of execution of an instruction to determine top N or bottom N data values and positions from a plurality of data values is disclosed and generally designated 200.

FIG. 2 illustrates the plurality of data values 114 (i.e., 10, 12, 4, 5, 3 ... $X_{n-1}$) and corresponding position indicators 116 (i.e., 0, 1, 2, 3, 4, n−1). In a particular embodiment, the data values may be stored at a memory (e.g., the memory 110 of FIG. 1) and may be selectively loaded into the storage device 126 or any other device capable of storing a plurality of data values (e.g., a register). In another particular embodiment, each corresponding position indicator 116 may be generated as each data value of the plurality of data values 114 is selectively loaded into the storage device 126. The storage device 126 may include N storage locations, where N is an integer value greater than 0 and where N corresponds to the top N or bottom N data values desired. The plurality of storage locations may be configured to store a subset of the data values 114 and the position indicators 116. In a particular embodiment, the plurality of storage locations may be configured to store any other attributes associated with the data values. Further, comparators 124 may be coupled to or correspond to each of the N storage locations of the storage device 126 (e.g., a greater than '>' comparator when determining top N or a less than '<' comparator when determining bottom N), to compare an input data value to elements stored in the storage locations. Prior to executing the Peak_Positions instruction 112, the storage locations may be initialized with elements (e.g., data values) or may be cleared (i.e., set to NULL). Alternately, or in addition, validity bits (V) corresponding to each storage location may be cleared (e.g., set to '0'), as shown in step A of FIG. 2.

During a first execution cycle of the processor, the data value '10' may be loaded from memory and comparisons may be performed with respect to elements stored in the N storage locations of the storage device 126. In this case, none of the comparators will fire because there are no validity bits (designated 'V') in the storage device 126 that are set to '1.' Hence, the data value '10' is inserted into the first location of the storage device 126 in the appropriate data portion (designated 'D'). In addition, the position indicator '0' corresponding to the data value '10' is inserted into the first location of the storage device in the portion designated 'I.'

After loading the data value '10' and the position indicator '0' into the first location, the validity bit for the first storage location is set to '1.' (See step B). Next, the data value '12' is loaded from memory and evaluated by the comparators 124 during a second execution cycle of the processor. Because '12' is greater than '10,' the condition (i.e., > condition) is satisfied at the first comparator corresponding to the first storage location. Thus, the previously stored data value '10' and associated position indicator '0' are moved from the first storage location to a second storage location of the storage device 126, and the data value '12' and the associated position indicator '1' are inserted into the first storage location, as shown in step C. None of the other comparators fire because the other storage locations are invalid. In one implementation, the validity bits may thus be used as enable bits for the comparators 124.

During a third execution cycle, the data value '4' is loaded from memory and evaluated by the comparators 124. Because the condition (i.e., > condition) is not satisfied at the first storage location or at the second storage location, but at least one location is invalid, the data value '4' and associated position indicator '2' are inserted at a next available storage location (i.e., a third storage location) and the validity bit corresponding to the third storage location is set to '1,' as shown in step D. During a fourth execution cycle of the processor, the data value '5' is loaded from the memory and evaluated by the comparators 124. The condition is satisfied at the third storage location (i.e., 5>4). Hence, the data value '4' and the associated position indicator '2' are moved from the third storage location and inserted into a fourth storage location, and the data value '5' and the associated position indicator '3' are inserted into the third storage location and the validity bit is set to '1' at the fourth storage location, as shown in step E.

During a fifth execution cycle, the data value '3' is loaded from memory and evaluated by each of the comparators 124. Because the data value '3' is less than all the data values stored at the first, second, third, and fourth storage locations, and since all storage locations are valid, data value '3' may "pass through" the storage device 126 and may be discarded (i.e., not stored in the storage device 126), as shown in step F. The process may continue until each of the data values of the plurality of data values 114 has been processed as described above.

Thus, the top N or bottom N data values and associated position indicators may be determined by executing the Peak_Positions instruction 112. For example, the output of execution of the Peak_Positions instructions may be the position indicators corresponding to the top 4 data values (i.e., 1, 0, 3, 2) and the top 4 data values (i.e., 12, 10, 5, 4). It should be noted that although a greater than comparator is used in the embodiment described above, a less than comparator may alternatively be used (e.g., to extract the bottom N data values). Further, the process described above may be implemented using parallel computation by using more than one storage device (e.g., using 2 storage devices as illustrated in FIG. 3).

In a particular embodiment, the plurality of data values 114 may represent computed signal strengths and the position indicators 126 may represent signal sources corresponding to the signal strengths. Alternately, the position indicators 126 may represent different times (e.g., T0, T1, T2 . . . Tn) that a plurality of signals (e.g., data values 114) arrive at a receiver, such as signals received from multiple directions (e.g., due to multipath fading causing time lags). Thus, top N position indicators may represent which sources (or signals received at certain times) should be further processed by a wireless receiver.

Figure 3:
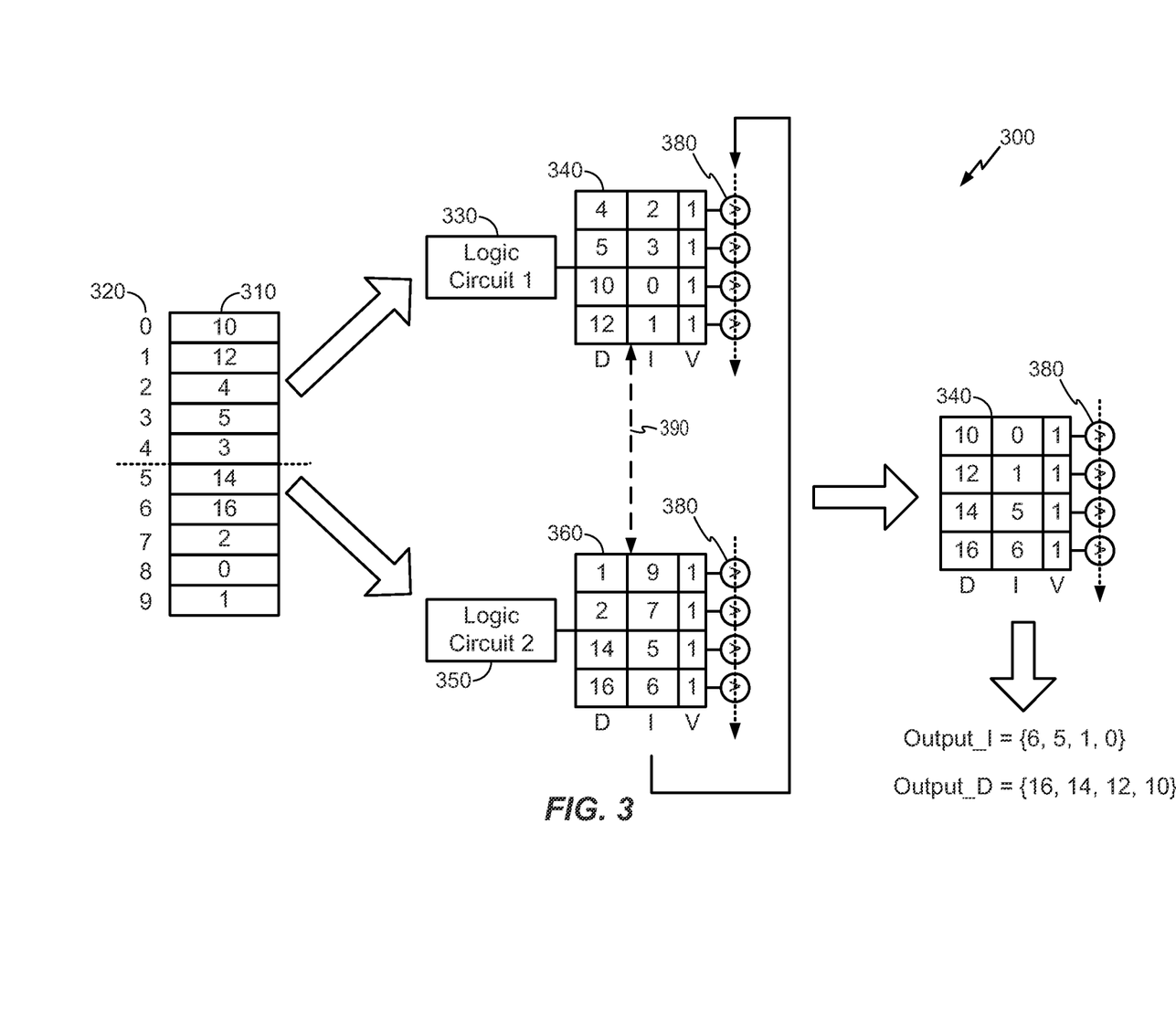
FIG. 3 is a diagram that illustrates execution of an instruction to determine top N or bottom N data values and positions from a plurality of data values by dividing the plurality of data values into first and second sets of data values and processing the first and second sets using multiple logic circuits in parallel.

Referring to FIG. 3, a particular illustrative embodiment of execution of an instruction that determines top N or bottom N data values and positions from a plurality of data values by dividing the plurality of data values into first and second sets of data values to by processed by multiple logic circuits is disclosed and generally designated 300.

FIG. 3 illustrates a plurality of data values 310 (i.e., 10, 12, 4, 5, 3, 14, 16, 2, 0, 1) having corresponding position indicators 320 (i.e., 0, 1, 2, 3, 4, 5, 6, 7, 8, 9), a first logic circuit 330, a second logic circuit 350, a first storage device 340, a second storage device 360, a first plurality of comparators 380, and a second plurality of comparators 390.

In a particular embodiment, executing the instruction 112 may include comparing a second data value of the plurality of data values 114 to an element stored at a location of a second storage device (e.g., the second storage device 360) and when the second data value satisfies the condition with respect to the element, moving the element to a second location of the second storage device and inserting the second data value into the location of the second storage device. Thus, the instruction 112 may be executed using a first storage device and a second storage device and may process the plurality of data values in parallel (i.e., two data values at a time, where a first data value is processed at the first storage device and a second data value is processed at the second storage device).

To illustrate, the plurality of data values 320 may be divided into a first set of data values and a second set of data values. For example, the first set of data values of the plurality of data values 310 may include data values 10, 12, 4, 5, and 3 with corresponding position indicators 0, 1, 2, 3, and 4, respectively, and the second set of data values of the plurality of data values 310 may include data values 14, 16, 2, 0, and 1 with corresponding position indicators 5, 6, 7, 8, and 9, respectively. The first logic circuit 330 and the first comparators 380 may process the first set of data values to produce the top 4 of the first set of data values in the first storage device 340, as shown (i.e., 12, 10, 5, 4). It should be noted that the first logic circuit 330 and the first comparators 380 process the first set of data values in the same manner that the logic circuit 122 and comparators 126 of FIGS. 1 and 2 process the plurality of data values 114. Similarly, the second logic circuit 350 and the second comparators 390 may process the second set of data values to produce the top 4 of the second set of data values in the second storage device 360 (i.e., 16, 14, 2, 1). The first logic circuit 330 and the second logic circuit 350 may operate in parallel.

The output of the processing of the second set of data values (i.e., 16, 14, 2, 1) may then be fed as an input for processing by the first logic circuit 330 and the first comparators 380. For example, the first logic circuit 330 and the first comparators 380 may compare and selectively replace one or more of the data values stored in the first storage device 340 (i.e., 12, 10, 5, 4) with the data values 16, 14, 2, and 1 output from the second storage device 360 when the greater than condition is satisfied at the first storage device 340. The result is a final set of top 4 data values of the plurality of data values 310 stored in the first storage device 340. The processor 120 may output the top 4 data values (16, 14, 12, 10) of the plurality of data values 310 and the corresponding position indicators (i.e., 6, 5, 1, 0). In a particular embodiment, the position indicators 6, 5, 1, and 0 may correspond to wireless signal samples having the 4 highest signal strengths (as measured by a wireless device into which the system 300 is integrated).

By splitting the plurality of data values 310 into a first set of data values and a second set of data values, certain processing of the first set of data values and the second set of data values may occur in parallel, resulting in faster processing of the plurality of data values 310 at the processor 120. For example, top 4 or bottom 4 data values (i.e., N=4) of 16 total data values (i.e., n=16) may be determined in 12 execution cycles using two storage devices (i.e., 8 execution cycles to load, compare, move, and insert two data values in pairs to get top 4 data values per storage device plus 4 execution cycles to load/compare/move/insert the top 4 data values from the second storage device to the first storage device). Hence, the performance of the processor may be improved.

It should be noted that the process described above may be implemented using a less than condition at each of the first comparators 380 and the second comparators 390 (e.g., to determine bottom N values and position indicators). The process may also be implemented using a greater than condition at the first comparators 380 and a less than condition at the second comparators 390 without dividing the plurality of data values 310 into sets (e.g., to simultaneously identify top 4 values at a first storage device and bottom 4 data values at the second storage device).

It should also be noted that the process described above may be implemented using M storage devices (and corresponding M logic units) in parallel, where each of the M storage devices includes N elements (or storage locations), where the M storage devices are operable to determine a top (M/Y)*(Y*N) or a bottom (M/Y)*(Y*N) set of data values, and where Y is an integer greater than 0. For example, if there are 2 (i.e., M=2) storage devices (and corresponding logic units) that process 2 data values at a time and each storage device includes 4 (i.e., N=4) elements (i.e., storage locations), then the 2 storage devices may be operable to determine a top 8 data values (i.e., Y=M=2) by processing one data value at a time (M/Y=2/2=1) to get top 8 values (Y*N=2*4=8). To illustrate, referring again to FIG. 3, one data value of the plurality of data values 310 may be processed per execution cycle (i.e., M/Y=1) to get the top 8 or the bottom 8 values (i.e., Y*N=2*4=8). Thus, the first storage device 340 may be combined (or merged) with the second storage device 360, at 390, to achieve a single storage device having 8 storage locations. In this case, the processor 120 may output the top 8 data values (16, 14, 12, 10, 5, 4, 3, 2) of the plurality of data values 310 as Output_D and the corresponding position indicators (6, 5, 1, 0, 3, 2, 4, 7) as Output_I.

Figure 4:
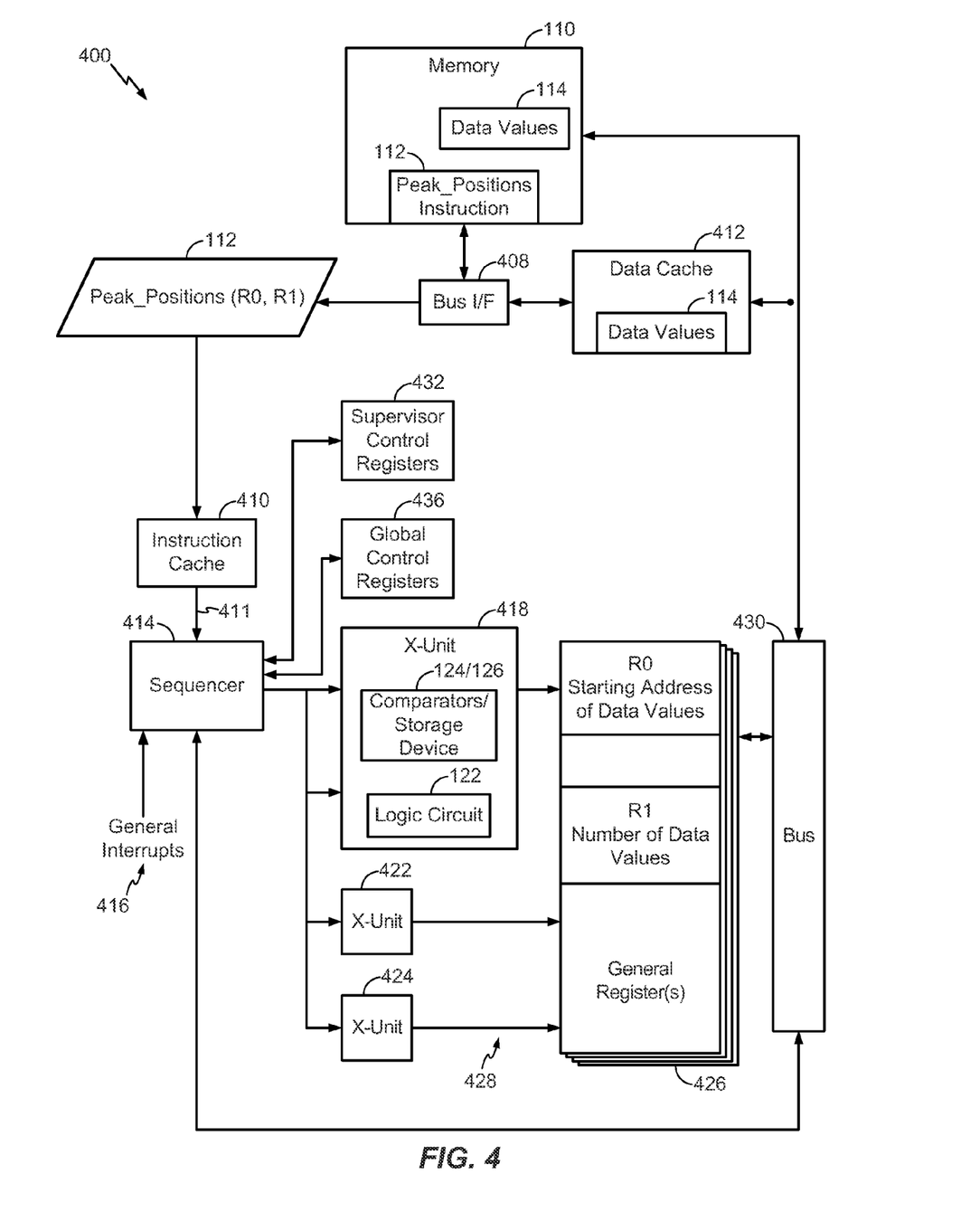
FIG. 4 is an embodiment of a system that includes a memory storing an instruction and a plurality of data values and a processor to execute the instruction to determine top N or bottom N data values and positions from the plurality of data values.

Referring to FIG. 4, a particular illustrative embodiment of a system including a memory 110 storing a Peak_Positions instruction 112 and a plurality of data values 114 and an execution unit to execute the instruction 112 to determine top N or bottom N data values and positions from the plurality of data values 114 is disclosed and generally designated 400. The memory 110 may be coupled to an instruction cache 410 via a bus interface 408. In a particular embodiment, all or a portion of the system 400 may be integrated into a processor. Alternately, the memory 110 may be external to the processor.

The memory 110 may send the Peak_Positions instruction 112 to the instruction cache 410 via the bus interface 408. The Peak_Positions instruction 112 may include operands 'R0' and 'R1' identifying the plurality of data values 114 to be processed. For example, 'R0' may identify a register indicating a starting address of the data values 114 and 'R1' may identify a register indicating a number of data values to be processed. To illustrate, the starting address of the data values 114 may be stored in register R0 and the number of data values may be stored in register R1. Registers R0 and R1 may be part of a general register file 426. A data cache 412 may also be coupled to the memory 110 via the bus interface 408. The data cache 412 may store the data values 114 during execution of the instruction 112. The instruction cache 410 may be coupled to a sequencer 414 via a bus 411. The sequencer 414 may receive general interrupts 416, which may be retrieved from an interrupt register (not shown). In a particular embodiment, the instruction cache 410 may be coupled to the sequencer 414 via a plurality of current instruction registers (not shown), which may be coupled to the bus 411 and associated with particular threads (e.g., hardware threads) of the processor 400. In a particular embodiment, the processor 400 may be an interleaved multi-threaded processor including six (6) threads.

In a particular embodiment, the bus 411 may be a one-hundred and twenty-eight bit (128-bit) bus and the sequencer 414 may be configured to retrieve instructions from the memory 110 via instruction packets, including the Peak_Positions instruction 112, having a length of thirty-two (32) bits each. The bus 411 may be coupled to a first instruction execution unit 418, a second instruction execution unit 422, and a third instruction execution unit 424. One or more of the execution units 418, 422, and 424 may include a logic circuit 122, a plurality of comparators 124 and a storage device 126 to determine and store top N or bottom N data values. The comparators 124 and the storage device 126 may be a single unit or may be separate units within the execution unit (e.g., the execution unit 418). It should be noted that there may be fewer or more than three instruction execution units. Each instruction execution unit 418, 422, and 424 may be coupled to the general register file 426 via a second bus 428. The general register file 426 may also be coupled to the sequencer 414, the data cache 412, and the memory 110 via a third bus 430. In a particular embodiment, one or more of the execution units 418, 422, and 424 may be load/store units.

The system 400 may also include supervisor control registers 432 and global control registers 436 to store bits that may be accessed by control logic within the sequencer 414 to determine whether to accept interrupts (e.g., the general interrupts 416) and to control execution of instructions.

In a particular embodiment, the instruction cache 410 may issue the Peak_Positions instruction 112 to any of the execution units 418, 422, and 424. For example, the execution unit 418 may receive the Peak_Positions instruction 112 and may execute the Peak_Positions instruction 112. The execution unit 418 may also receive the data values identified by the Peak_Positions instruction 112 from the memory 110 or from the data cache 412. The comparators 124 of the execution unit 418 may compare a particular data value of the data values 114 to a first element stored at a first location of the storage device 126. When the particular data value satisfies a condition (e.g., a greater than or less than condition) with respect to the first element stored at the first location of the storage device 126, the logic circuit 122 of the execution unit 418 may move the first element to a second location of the storage device 126 and insert the particular data value into the first location of the storage device 126. In a particular embodiment, the condition is satisfied when the particular data value is greater than the first element. Alternately, the condition may be satisfied when the particular data value is less than the first element. The comparison and selective move-and-insert operations may be performed for each data value of the data values 114.

Thus, the system 400 of FIG. 4 may output top N or bottom N data values from a plurality of data values (i.e., n data values) having associated data attributes (e.g., position indicators) by using fewer execution cycles compared to a complete sort of all of the plurality of data values. It should be noted that the Peak_Positions instruction 112 may be executed by a plurality of execution units in parallel by dividing the data values 114 into a plurality of sets of data values (e.g., a first set of data values, a second set of data values, and a third set of data values to be processed by execution units 418, 422, and 428, respectively, in parallel) to improve the performance of executing the instruction 112 by the processor 400.

Figure 5:
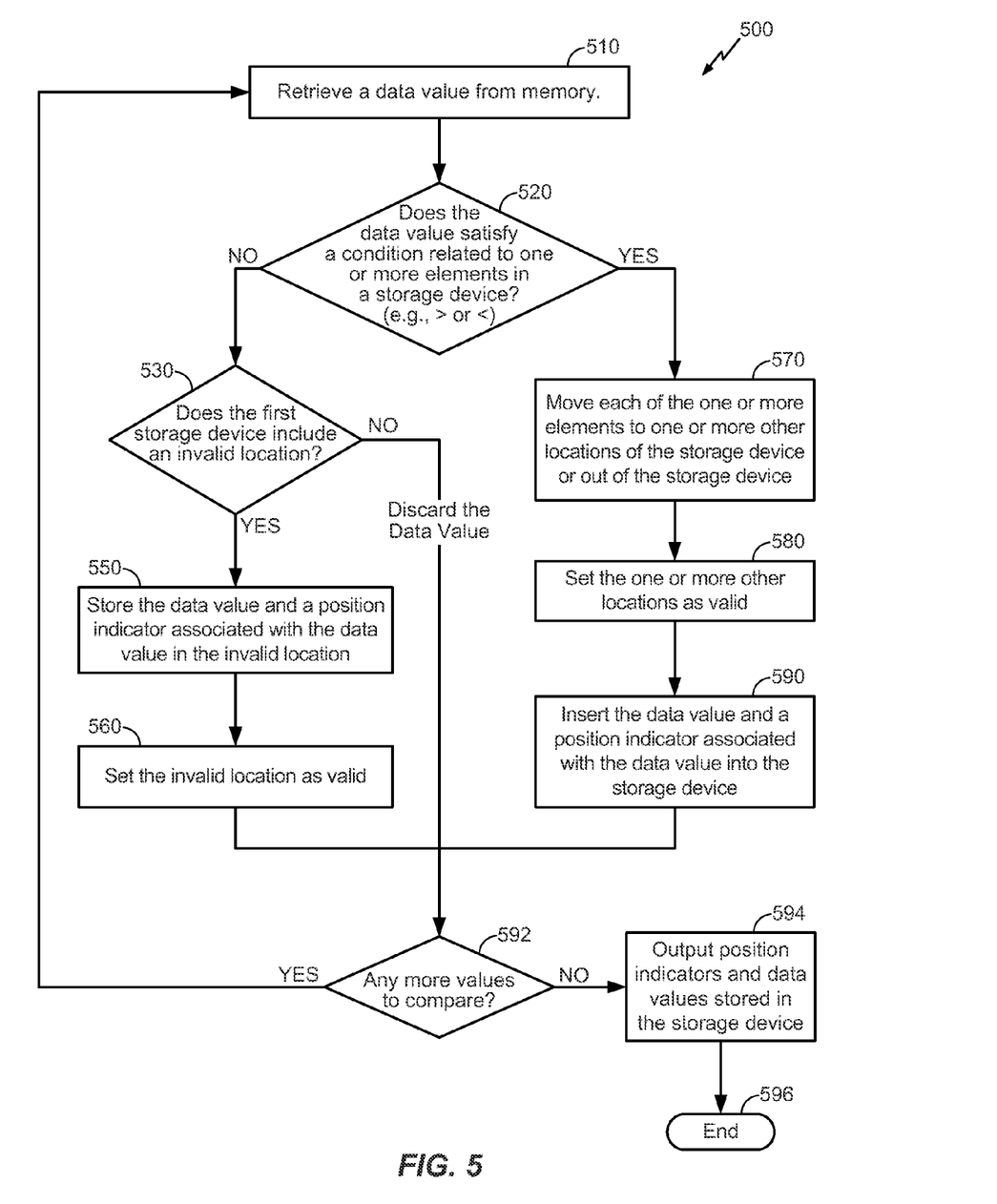
FIG. 5 is a flow chart of a particular illustrative embodiment of a method of executing an instruction to determine top N or bottom N data values and positions from a plurality of data values.

Referring to FIG. 5, a particular illustrative embodiment of a method of executing an instruction that determines top N or bottom N data values and positions from a plurality of data values is disclosed and generally designated 500. In an illustrative embodiment, the method 500 may be performed at the system 400 of FIG. 4 and may be illustrated with reference to FIGS. 1 and 2.

The method 500 may include retrieving a representative data value from memory, at 510. For example, the data value may be one of a plurality of data values stored in the memory and identified by an instruction. To illustrate, the Peak_Positions instruction 112 may identify a plurality of data values 114 stored at the memory 110 or at the data cache 412.

The method 500 may also include determining whether the data value satisfies a condition relating to one or more elements in a storage device, at decision element 520. In a particular embodiment, the condition is satisfied when the data value is greater than any of the one or more elements in the storage device. In another particular embodiment, the condition is satisfied when the data value is less than any of the one or more elements in the storage device. For example, in FIG. 1, the comparators 124 may compare the data value '5' with each of a first element, a second element, and a third element (i.e., 12, 10, and 4) stored in a first location, a second location, and a third location, respectively, of the storage device 126.

When the data value satisfies the condition relating to the one or more elements in the storage device, the method 500 includes moving each of the one or more elements to one or more other locations of the storage device or out of the storage device, at 570. As illustrated in FIG. 1, when it is determined that the data value '5' satisfies the condition with respect to the third element '4' (i.e., 5>4), the third element '4' is moved to a fourth location. In this case, the third element '4' is moved to another location of the storage device 126 because the fourth location is unoccupied. If however, the fourth location was occupied by an element, '4' may be moved out the storage device or may replace the other element in the fourth location.

The method 500 also includes setting the one or more other locations as valid, such as by setting the validity bit within the data storage device, at 580, and inserting the data value and the position indicator associated with the data value into the storage device, at 590. For example, in FIG. 1, after moving the third element '5' to the fourth location, the data value '5' may be inserted into the third location of the storage device and the validity bit corresponding to the fourth location, containing element '4,' may be set to 1 (i.e., valid). Further, the position indicator associated with the data value '5' (i.e., '3') may also be inserted into the third location of the storage device 126. In a particular embodiment, other attributes (e.g., wireless signal attributes, etc) associated with the data value may be inserted into the storage device 126. The method 500 then proceeds to 592.

When the data value does not satisfy the condition at 520, the method 500 includes determining whether the storage device includes an invalid location, at 530, and if so, storing the data value and a position indicator associated with the data value in the invalid location. For example, if the data value is the data value '4' shown in step C of FIG. 2, the condition is not satisfied with respect to the first element '12' and the second element '10' in the first location and the second location, respectively (i.e., because 4<12 and 4<10). However, because at least one invalid location exists in the storage device 126 (i.e., the third and fourth locations), the data value '4' may be inserted into the third location. Further, the position indicator '2' associated with the data value '4' may also be inserted into the third location of the storage location 126, as shown in step D of FIG. 2. The method also includes setting the invalid location as valid, at 560. For example, as illustrated in step D of FIG. 2, the validity bit corresponding to the third location is set to '1' when the data value '4' and its corresponding position indicator '2' are inserted into the third location of the storage device 126. The method 500 then proceeds to step 592.

If it is determined that the storage device does not include an invalid location, at 530, then the data value is discarded and the method 500 continues to step 592. For example, if the storage device 126 includes a valid first element, a valid second element, a valid third element, and a valid fourth element (e.g., 12, 10, 5, 4) in the first location, the second location, the third location, and the fourth location, respectively, then a data value '3' that does not satisfy the condition with respect to any of the elements 12, 10, 5, and 4 is discarded since the storage locations are occupied and all the validity bits are set, as shown in steps E and F of FIG. 2.

At decision step 592, it is determined whether any more data values are available for comparison. If any more values are available for comparison at 592, the method 500 returns to retrieving the next data value from memory, at 510, and proceeds as described above until all data values have been retrieved from the memory and evaluated. When there are no more data values to retrieve at 592, then the method 500 includes outputting position indicators and the corresponding values stored in the storage locations (e.g., representing the top N or the bottom N data values), at 594. For example, the processor 120 may output "1, 0, 3, 2" corresponding to the position indicators of the top N data values of the plurality of data values 114, as shown in FIGS. 1 and 2. The method 500 ends, at 596. By identifying a subset of the plurality of data values instead of first sorting the entire plurality of data values to obtain a top N or bottom N data values, fewer execution cycles can be utilized leading to a reduction in power consumption of the processor.

Figure 6:
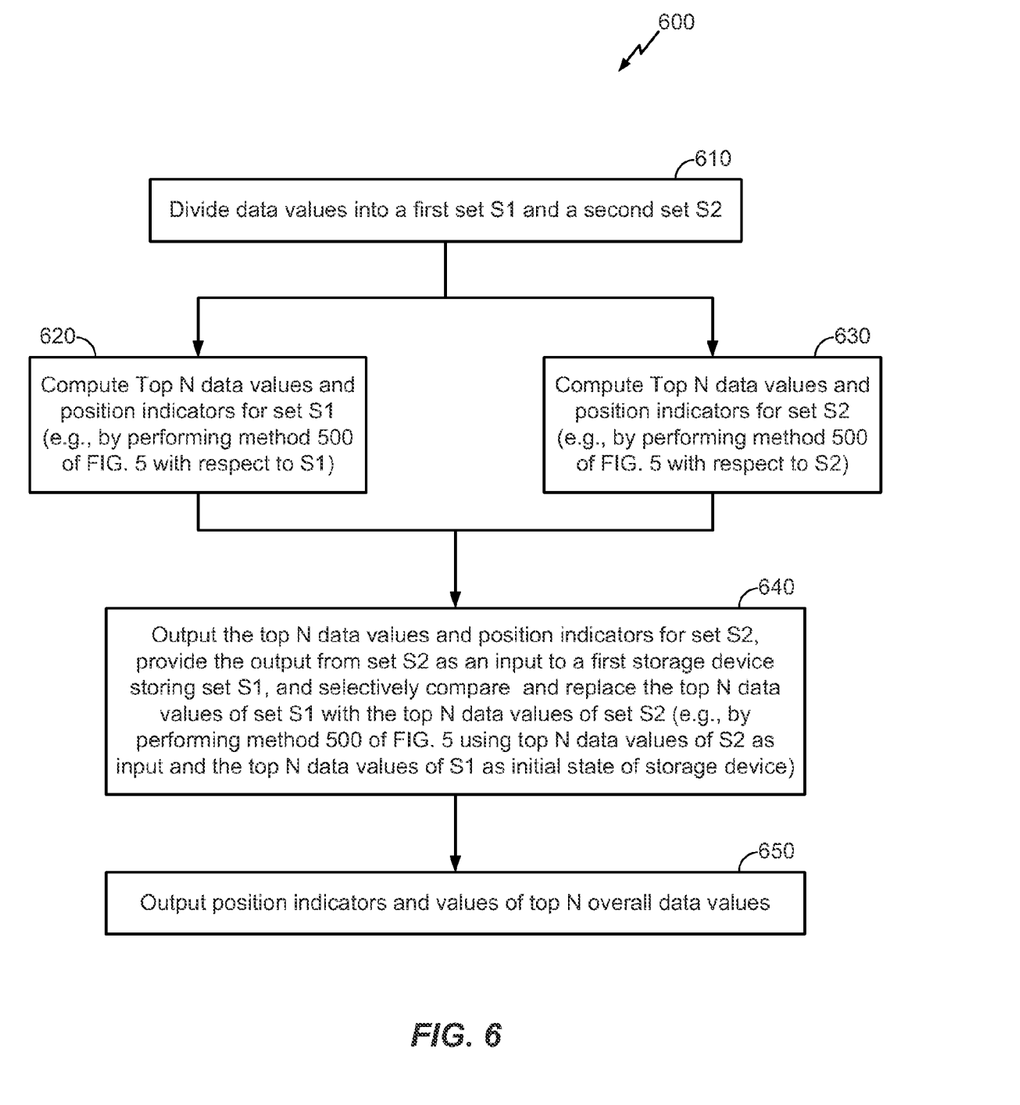
FIG. 6 is a flow chart of a particular illustrative embodiment of a method of executing an instruction to determine top N or bottom N data values and positions by dividing the plurality of data values into first and second sets of data values.

Referring to FIG. 6, a particular illustrative embodiment of a method of executing an instruction that determines top N or bottom N data values and positions by dividing the plurality of data values into a first set of data values and a second set of data values to be processed in parallel is disclosed and generally designated 600. In an illustrative embodiment, the method 600 may be performed at the system 400 of FIG. 4 and may be illustrated with reference to FIG. 3.

The method 600 includes dividing data values into a first set S1 and a second set S2, at 610. For example, the first set S1 may include the data values 10, 12, 4, 5, and 3 with corresponding position indicators 0, 1, 2, 3, and 4 of the plurality of data values 310 of FIG. 3. The second set S2 may include the data values 14, 16, 2, 0, and 1 with corresponding position indicators 5, 6, 7, 8, and 9. The method 600 also includes computing top N data values and position indicators for set S1, at 620. For example, top N data values and position indicators for set S1 may be computed by performing the method 500 of FIG. 5 with respect to set S1. To illustrate, the first logic circuit 330, the first comparators 380, and the first storage device 340 of FIG. 3 may be utilized to produce top N data values 12, 10, 5, and 4 with corresponding position indicators 1, 0, 3, and 2, respectively.

In parallel and during the same execution cycle(s), the method 600 also includes computing top N data values and position indicators for set S2, at 630. For example, top N data values and position indicators for set S2 may be computed by performing the method 500 of FIG. 5 with respect to set S2. To illustrate, the second logic circuit 350, the second comparators 390, and the second storage device 360 of FIG. 3 may be utilized to produce top N data values 16, 14, 2, and 1 with corresponding position indicators 6, 5, 7, and 9, respectively.

After determining the top N data values of the first set S1 and the second set S2, the method 500 includes receiving the output data values representing the top N values of the second set S2 (i.e., 16, 14, 2, 1), providing the output data values representing the top N values of the second set S2 (i.e., 16, 14, 2, 1) as an input to the first storage device 340, and selectively comparing and replacing the data values of the first set S1 with respect to the data values of the second set S2 (i.e., selectively inserting data values of the second set S2 when the condition is satisfied with respect to the data values of the first set S1). For example, the data values 16, 14, 2, and 1 of the second set S2 are each fed into the first logic circuit 330 and evaluated by the first comparators 380 with respect to the data values 12, 10, 5, and 4 of the first set S1 located in the first storage device 340 to obtain the top N overall data values. The overall top N data values and position indicators may be computed by performing the method 500 of FIG. 5. The method 600 also includes outputting position indicators and values of the top N overall data values, at 650. For example, after selectively comparing and replacing data values of the first set S1 with respect to the data values of the second set S2, the top N data values obtained in the first storage device 340 include 16, 14, 12, and 10 with corresponding position indicators 6, 5, 1, and 0, as shown in FIG. 3.

It should be noted that the method 500 of FIG. 5 and the method 600 of FIG. 6 may be implemented by a field-programmable gate array (FPGA) device, an application-specific integrated circuit (ASIC), a processing unit such as a central processing unit (CPU), a digital signal processor (DSP), a controller, another hardware device, firmware, or any combination thereof. As an example, the method 500 of FIG. 5 and the method 600 of FIG. 6 may be performed by a processor or component thereof that executes program code or instructions, as described with respect to FIGS. 2-3.

Figure 7:
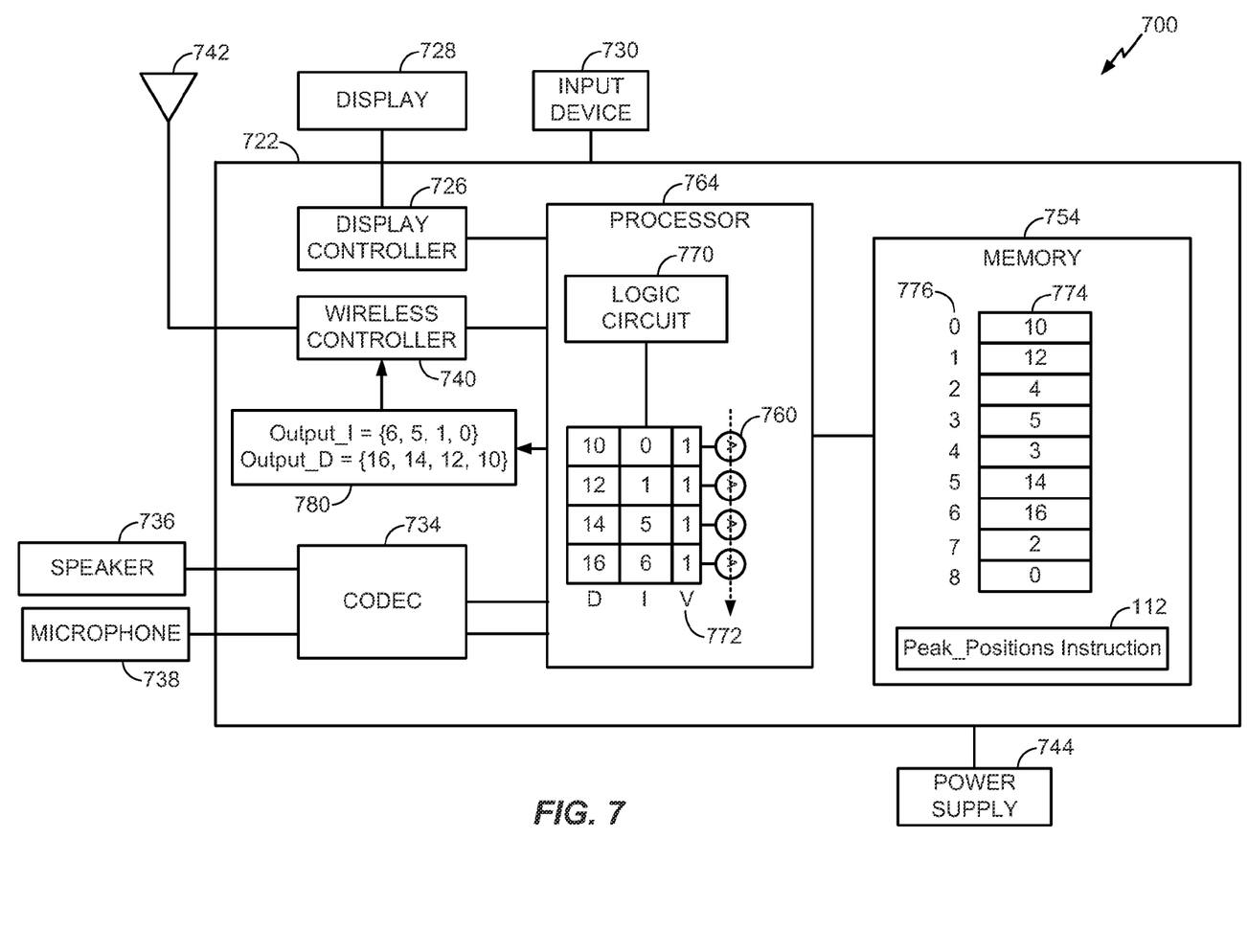
FIG. 7 is a block diagram of a wireless device including a processor operable to execute an instruction to determine top N or bottom N data values and positions from a plurality of data values.

Referring to FIG. 7, a block diagram of a particular illustrative embodiment of a wireless device that includes a processor operable to execute an instruction to determine top N or bottom N data values and positions from a plurality of data values is depicted and generally designated 700. The device includes a processor 764 coupled to a memory 754. The memory 754 may include an instruction (e.g., the Peak_Positions instruction 112) that identifies a plurality of data values 774 and corresponding position indicators 776 from which top N or bottom N data values is to be determined.

The processor 764 may include a logic circuit 770, a storage device 772, and a plurality of comparators 760. The processor 764 may be configured to execute the Peak_Positions instruction 112 to determine top N or bottom N data values. For example, the processor 764 may receive the plurality of data values 774 for processing. In particular, the logic circuit 770 of the processor 764 may receive and evaluate each of the plurality of data values 774 to determine the top N or bottom N values to be stored in the storage locations of the storage device 772. As illustrated in FIG. 7, as an example where N=4, the top 4 data values and corresponding position indicators in the storage device 772 include "16, 14, 12, 10" and "6, 5, 1, 0," respectively. The processor 764 may output the position indicators of the top 4 data values to a wireless controller 740 coupled to the processor 764. In a particular embodiment, the position indicators (e.g., 6, 5, 1, 0) may correspond to wireless signal samples having the 4 highest signal strengths as measured by the wireless device 700 into which the processor 764 is integrated.

FIG. 7 also shows a display controller 726 that is coupled to the processor 764 and to a display 728. A coder/decoder (CODEC) 734 can also be coupled to the processor 764. A speaker 736 and a microphone 738 can be coupled to the CODEC 734.

FIG. 7 also indicates that the wireless controller 740 can be coupled to the processor 764 and to a wireless antenna 742. The wireless controller 740 may be configured to receive an output 780 of the processor 764, where the output 780 corresponds to the position indicators of the top N or bottom N data values of the plurality of data values 774 determined by the processor 764 and the top N or bottom N data values (i.e., Output_I={6, 5, 1, 0} and Output_D={16, 14, 12, 10}). In a particular embodiment, the processor 764, the display controller 726, the memory 754, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the wireless antenna 742, and the power supply 744 are external to the system-on-chip device 722. However, each of the display 728, the input device 730, the speaker 736, the microphone 738, the wireless antenna 742, and the power supply 744 can be coupled to a component of the system-on-chip device 722, such as an interface or a controller.

It should be noted that although FIG. 7 depicts a wireless communications device, the processor 764 and the memory 732 may also be integrated into other electronic devices, such as a set top box, a music player, a video player, an entertainment unit, a navigation device, a personal digital assistant (PDA), a fixed location data unit, a mobile (e.g., laptop or tablet) computer, or a stationary computer.

In conjunction with the described embodiments, an apparatus is disclosed that includes a memory storing an instruction that identifies a plurality of data values and means for processing the instruction. For example, the means for processing the instruction may include the processor 120 of FIG. 1, one or more of the execution units 418, 422, and 424 of FIG. 4, the processor 764 of FIG. 7, one or more devices configured to process an instruction, or any combination thereof.

The means for processing may include means for comparing a data value of a plurality of data values to a first element stored at a first storage location of a storage means. For example, the means for comparing may include any of the comparators 124 of FIGS. 1-2 and 4, the comparators 380 and 390 of FIG. 3, the comparators 760 of FIG. 7, or one or more other devices configured to compare a data value of a plurality of data values to a first element stored at a first storage location of a storage device or any storage means. The storage means may include the storage device 126 of FIGS. 1-2 and 4, the storage device 340 of FIG. 3, the storage device 360 of FIG. 3, the storage device 772 of FIG. 7, one or more devices configured to store elements, any storage medium, or any combination thereof.

The means for processing may also include means for moving the first element to a second location of the storage means. For example, the means for moving may include the logic circuit 122 of FIGS. 1 and 4, the first logic circuit 330 and the second logic circuit 350 of FIG. 3, the logic circuit 770 of FIG. 7, one or more devices configured to move a first element to a second location of a storage means, or any combination thereof.

The means for processing may include means for inserting the data value into the first location of the storage means when the data value satisfies a condition with respect to the first element. For example, the means for inserting may include the logic circuit 122 of FIGS. 1 and 4, the first logic circuit 330 and the second logic circuit 350 of FIG. 3, the logic circuit 770 of FIG. 7, one or more devices configured to insert a data value into a location of a storage means, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    receiving a plurality of input data values and a plurality of position indicators at a processor, wherein each position indicator of the plurality of position indicators is associated with a corresponding input data value of the plurality of input data values and indicates a relative position of the corresponding input data value in the plurality of input data values;
    comparing a data value of the plurality of input data values to a first element stored at a first location of a first storage device;
    when the data value satisfies a condition with respect to the first element, moving the first element to a second location of the first storage device and inserting the data value into the first location of the first storage device; and
    outputting one or more of the received plurality of position indicators that correspond to one or more data values stored in the first storage device.

2. The method of claim 1, wherein after the moving and the inserting, the first location stores the data value and a first position indicator associated with the data value and the second location stores the first element and a second position indicator associated with the first element.

3. The method of claim 1, wherein the condition is satisfied when the data value is greater than the first element.

4. The method of claim 1, wherein the condition is satisfied when the data value is less than the first element.

5. The method of claim 1, wherein the plurality of input data values represents a plurality of signal samples.

6. The method of claim 1, further comprising loading the data value from a memory.

7. The method of claim 1, further comprising:
comparing a second data value of the plurality of input data values to an element stored at a location of a second storage device; and
when the second data value satisfies the condition with respect to the element, moving the element to a second location of the second storage device and inserting the second data value into the location of the second storage device.

8. The method of claim 7, further comprising identifying a top N or a bottom N set of data values of the plurality of input data values, wherein N is equal to a number of locations of the first storage device and wherein the identifying comprises:
comparing the second data value stored in the second storage device to data values stored in the first storage device; and
selectively replacing one or more of the data values stored in the first storage device with the second data value when the condition is satisfied.

9. The method of claim 1, wherein comparing the data value, moving the first element, and inserting the data value are performed in a single execution cycle of the processor.

10. The method of claim 1, further comprising initializing each location of the first storage device as invalid, wherein initializing a particular location as invalid comprises clearing a validity bit of the particular location.

11. The method of claim 10, further comprising:
for each particular data value of the plurality of input data values:
determining whether the particular data value satisfies the condition with respect to any element stored in a valid location of the first storage device;
when the particular data value does not satisfy the condition with respect to any element stored in a valid location and when the first storage device includes an invalid location, storing the particular data value and a particular position indicator associated with the particular data value in the invalid location, and setting the invalid location as valid;
when the particular data value satisfies the condition with respect to one or more elements stored in valid locations of the first storage device:
moving each of the one or more elements to one or more other locations of the first storage device or out of the first storage device;
setting the one or more other locations as valid; and
inserting the particular data value and the particular position indicator associated with the particular data value into the first storage device.

12. The method of claim 1, wherein each position indicator of the plurality of position indicators indicates a signal source, a time, or a combination thereof.

13. An apparatus comprising:
a memory storing an instruction that identifies a plurality of input data values, each input data value of the plurality of input data values having a position indicator of a plurality of position indicators, wherein each position indicator indicates a relative position of a corresponding input data value in the plurality of input data values;
a comparator to compare a data value of the plurality of input data values to a first element stored at a first location of a storage device; and
a logic unit:
to receive the plurality of input data values and the plurality of position indicators from the memory;
to move the first element to a second location of the storage device and to insert the data value into the first location of the storage device when the data value satisfies a condition with respect to the first element; and
to output one or more of the received plurality of position indicators that correspond to one or more data values stored in the storage device.

14. The apparatus of claim 13, further comprising M storage devices, wherein each of the M storage devices includes N elements, wherein (M/Y) storage devices determine in parallel a top (Y*N) or a bottom (Y*N) set of data values, and wherein Y is an integer greater than 0.

15. An apparatus comprising:
a memory storing an instruction that identifies a plurality of input data values, each data value of the plurality of input data values having a position indicator of a plurality of position indicators, wherein each position indicator indicates a relative position of a corresponding input data value in the plurality of input data values; and
a processor to execute the instruction, the processor comprising:
a first comparator to compare a first data value of a first set of data values of the plurality of input data values to a first element stored at a first location of a first storage device;
a first logic unit to receive the first set of data values and a first set of corresponding position indicators, to move the first element to a second location of the first storage device, and to insert the first data value into the first location of the first storage device when the first data value satisfies a condition with respect to the first element;
a second comparator to compare a second data value of a second set of data values of the plurality of input data values to a second element stored at a first location of a second storage device; and
a second logic unit to receive the second set of data values and a second set of corresponding position indicators, to move the second element to a second location of the second storage device, and to insert the second data value into the first location of the second storage device when the second data value satisfies the condition with respect to the element,
wherein an output of the second storage device is coupled to an input of the first storage device, and wherein the first logic unit is further configured to output one or more of the received plurality of position indicators that correspond to one or more data values stored in the first storage device.

16. The apparatus of claim 15, wherein the first logic unit is further configured to identify a top N or a bottom N set of data values, wherein N is equal to a number of locations of the first storage device.

17. The apparatus of claim 16, wherein each position indicator output by the first logic unit is associated with a corresponding data value of the top N or the bottom N set of data values.

18. An apparatus comprising:
a memory storing an instruction that identifies a plurality of input data values; and
means for processing the instruction, wherein the means for processing comprises:
means for comparing a data value of the plurality of input data values to a first element stored at a first location of a storage means, each input data value of the plurality of input data values having a position indicator of a plurality of position indicators, wherein each position indicator indicates a relative position of the corresponding input data value in the plurality of input data values;

means for moving the first element to a second location of the storage means, wherein the means for moving is configured to receive the plurality of input data values and the plurality of position indicators;

means for inserting the data value into the first location of the storage means when the data value satisfies a condition with respect to the first element; and means for outputting one or more of the received plurality of position indicators that correspond to one or more data values stored in the storage means.

19. The apparatus of claim 18, wherein the plurality of data values represents a plurality of signal samples.

20. A non-transitory computer-readable medium including program code that, when executed by a processor, causes the processor to:

receive a plurality of input data values and a plurality of position indicators, wherein each position indicator of the plurality of position indicators is associated with a corresponding input data value of the plurality of input data values and indicates a relative position of the corresponding input data value in the plurality of input data values;

compare a data value of the plurality of input data values to a first element stored at a first location of a storage device;

move the first element to a second location of the storage device and inserting the data value into the first location of the storage device when the data value satisfies a condition with respect to the first element; and output one or more of the received plurality of position indicators that correspond to one or more data values stored in the first storage device.

21. The non-transitory computer-readable medium of claim 20, wherein the plurality of input data values represents a plurality of signal samples.

22. The non-transitory computer-readable medium of claim 21, wherein each position indicator of the plurality of position indicators indicates a signal source, a time, or a combination thereof.

* * * * *